(12) United States Patent
Leal Chavez et al.

(10) Patent No.: US 10,883,390 B2
(45) Date of Patent: Jan. 5, 2021

(54) COGENERATION SYSTEM FOR INTEGRATION INTO SOLAR WATER HEATING SYSTEMS

(71) Applicant: Centro de Investigación en Materiales Avanzados, S.C., Chihuahua (MX)

(72) Inventors: Daniel Arturo Leal Chavez, Chihuahua (MX); Ricardo Beltran Chacon, Chihuahua (MX)

(73) Assignee: Centrode Investigacion en Materiales Avanzados, S.C., Chihuahua (MX)

( * ) Notice: Subject to any disclaimer, the term of this patent is extended or adjusted under 35 U.S.C. 154(b) by 62 days.

(21) Appl. No.: 16/208,666

(22) Filed: Dec. 4, 2018

(65) Prior Publication Data

US 2019/0186302 A1    Jun. 20, 2019

(30) Foreign Application Priority Data

Dec. 19, 2017   (MX) .................... MX/a/2017/016744

(51) Int. Cl.

| | |
|---|---|
| *F01K 25/10* | (2006.01) |
| *F01D 15/10* | (2006.01) |
| *F01D 17/10* | (2006.01) |
| *F24S 80/20* | (2018.01) |
| *F01K 23/04* | (2006.01) |
| *F24S 20/30* | (2018.01) |
| *F01K 11/02* | (2006.01) |

(52) U.S. Cl.
CPC ............. *F01K 25/10* (2013.01); *F01D 15/10* (2013.01); *F01D 17/10* (2013.01); *F01K 11/02* (2013.01); *F01K 23/04* (2013.01); *F24S 20/30* (2018.05); *F24S 80/20* (2018.05)

(58) Field of Classification Search
CPC .......... F01K 25/10; F01K 17/04; F01D 15/10; F01D 17/10; F03G 6/067
See application file for complete search history.

(56) References Cited

U.S. PATENT DOCUMENTS

| | | | | |
|---|---|---|---|---|
| 8,544,273 | B2 * | 10/2013 | Brenmiller | F03G 6/067 60/641.8 |
| 2011/0126539 | A1 * | 6/2011 | Ramaswamy | F03G 6/003 60/641.2 |
| 2011/0131988 | A1 * | 6/2011 | Sampson | H02S 10/10 60/641.1 |
| 2014/0290247 | A1 * | 10/2014 | Mishima | B01D 3/065 60/641.9 |
| 2015/0033740 | A1 * | 2/2015 | Anderson | F28D 20/00 60/641.15 |
| 2018/0266279 | A1 * | 9/2018 | Duan | F02C 3/22 |

* cited by examiner

*Primary Examiner* — Shafiq Mian
(74) *Attorney, Agent, or Firm* — DeFillo & Associates; Evelyn A. DeFillo

(57) ABSTRACT

A cogeneration system to generate thermal energy in form of hot water, using the system's solar collector directly as an evaporator and a heat exchanger integrated in a thermal tank used as a condenser. A variable capacity expander (turbine) is used and the organic working fluid selection is specific for this application. Thus is provided a technological alternative for the production of electricity and thermal energy using a renewable energy source.

6 Claims, 1 Drawing Sheet

COGENERATION SYSTEM FOR INTEGRATION INTO SOLAR WATER HEATING SYSTEMS

OBJECTIVE OF THE INVENTION

The objective of this invention is to provide a system capable of generating both thermal energy and electrical energy simultaneously, providing hot water and electricity, meeting the needs of the site and taking advantage of the same solar gain surface.

BACKGROUND

In the last 10 years there has been a growing trend in the usage of solar water heaters in Mexico. Since the implementation of the program to promote solar heaters (PRO-CASOL) in the year 2007, up to the completion of its first phase in 2012, an aggregated surface of 1.4 millions square meters was installed, mainly in the residential sector. During 2013 and 2014, a growth rate of around 300 thousand square meters per year was maintained (Sener, 2015). In energetic terms, this increase in the solar water heaters surface has allowed increasing the use of solar energy for thermal applications from 2 petajoules in 2005 to 8 petajoules in 2014. For comparative purposes, the installed effective capacity and the gross generation of solar photovoltaic plants as of 2014 was 103 MW and 0.37 PJ (102.86 GWh).

This promotion of solar heaters installation is due to the fact that the 75% savings of LP gas for water heating, a typical case in a Mexican household, allows for a return on investment within 3 to 5 years (Beade Ruelas, 2016; CONUEE, 2015).

Cogeneration Systems

A cogeneration system that provides heat and electricity requires a lower primary energy consumption in comparison to the separate production of these services, which reduces the global energy cost and the polluting emissions to the atmosphere (Peris, Navarro-Esbrí, Molés, Martí, & Mota-Babiloni, 2015).

Currently, small-scale water heating is a cost-effective alternative for reducing fossil fuels consumption; however, the solar resource available during summer is unexploited due to the low demand of sanitary hot water during that season. Extending the usage of energy captured by solar collectors, through the integration of the cogeneration system proposed in this invention, would promote a technological alternative for electricity production through renewable energy, reducing fossil fuel dependency and the demand for electrical energy from the grid.

The recovery of heat at low temperatures represents one of the most important ways of increasing the efficiency of these energy systems, reducing fossil fuel use and improving energetic sustainability (Bracco, 2013).

Organic Rankine Cycle (ORC)

The Organic Rankine Cycle (ORC) is a proved technique to transform the unused low-temperature heat into mechanic energy or useful energy (Safarian, 2014), and is characterized by the simplicity, flexibility and relative low temperature of the operation (Bianchi & De Pascale, 2011). The ORC consists in the use of an organic fluid of a high molecular weight in the traditional Rankine cycle (Villarini, 2013). The advantage is that the boiling point of organic fluids is much lower than that of water; therefore, there is no need to have high temperatures to generate the steam that makes the micro-turbine or expander move (Rayegan, 2010). This characteristic allows to produce a useable mechanical power from low to medium temperature heat sources, such as biomass combustion, geothermal systems, low temperature exhaust fumes and of course, solar thermal energy (Bracco, 2013).

Focusing in residential and commercial applications, the ORC has been proposed as an appropriate technology, because it achieves high efficiencies from low temperatures and is economically attractive in micro-scale applications, which generally refers to electric applications 15 kWe (Dentice d'Accadia, Sasso, Sibilio & Vanoli, 2003).

Some companies have recently explored the implementation of ORC systems, however, none of them show such low scale systems, with 5 kW electrical power minimum outputs. This is due to the fact that the main commercial technology used is based on turbines and micro turbines, whose application is only economically attractive for capacities higher than 25 kW. Therefore, it is evident a lack of development in the domestic supply system sector. For this reason, is proposed the use of common air conditioning devices, in order to achieve a small cogeneration in a manner that is both economically and technically feasible.

The main differences of this invention, in comparison with the current micro-scale ORC developments are:

The solar collector is used as a direct steam generator within the cycle, which allows to eliminate the need for additional heat exchangers and thus to improve the total energetic efficiency of the cycle by avoiding heat losses caused by the use of such exchangers and avoiding an extra pump.

The variation of the heat supplied and the steam produced by the solar collector is regulated in the cycle by a control that governs the working fluid flow within the cycle to maintain the preset pressure and temperature conditions.

The system's operation mode can be easily and automatically modified through the change of valve positions to either operate only in a water heating mode, or to operate in a cogeneration mode.

The energy available in the working fluid at the expander's outlet is conducted to the hot water thermal tank in order to transfer heat indirectly, allowing using the thermal tank as the cycle main condenser and producing domestic hot water simultaneously with the ORC cycle waste heat.

The conditions for hot water and electric energy production may be set by the user through a control interface which is used to define the maximum temperature of hot water produced (which defines the start temperature of the cogeneration mode). Among the possibilities for settings by the user, it is also possible either to preset a preferred hot water production, or a preferred electricity production, a hot water preferred production, or an automatic mode where electric energy is produced when the water volume and temperature required for domestic use are not compromised.

To assess the current and future hot water needs, the control system has elements for water consumption monitoring from which it develops a forecast and uses it as a reference to estimate whether hot water production is compromised during the automatic mode operation. In the event of insufficient solar resources to keep the simultaneous production of electrical energy and hot water (automatic cogeneration mode), the control system automatically resets the systems deviating the flow before entering the expander to operate in water heating mode.

This invention is capable of operating at low temperatures to be used in the residential sector. This is significantly different from most of the reported systems, especially in terms of mass flow, temperature and capacity.

The objective of the system is to be able to provide hot sanitary water and electricity services simultaneously, driven by the need of using the same available solar collection surface and not restricting its use to only one service, either photovoltaic electricity or hot water.

Some documents related with this invention are shown below: Solar energy-driven cogeneration device (CN102094772 B, 2013). The difference between this system and the one proposed is the complexity and range suggested by this proposal, which needs working fluid reservoirs. Firstly, it heats oil and then transfers the oil heat into the organic fluid. Therefore, it requires more infrastructure (or equipment) and it has greater losses in the system.

Distributed-type heat and power cogeneration set capable of accumulating energy and heat (CN102242698 A, 2011). This system proposes heat storage for an isolated cogeneration, which requires intermediate heat exchangers and is used mainly as heat storage. It is not mentioned whether this system may work in a transitional way.

Integrated micro combined heat and power system (Thompson, 2003). This patent shows a domestic cogeneration, getting heat from a boiler or furnace, overheating a working fluid to provide for the needs of the user. However, it does not make much sense to spend more fuel than is necessary in order to generate more heat, for although certain amount of heat can be recovered, there will be energy losses in each process.

*Organic Rankine Cycle System* (Yanagi, 2015). This document shows a Rankine cycle where the heat supplied is controlled through a heat interchanger. It also has two expanders to better take advantage of the heat contained in the working fluid. These settings differ from our proposal in the manner for providing heat, and it also needs a higher temperature for a proper function.

*Small scale cogeneration system for producing heat and electrical power* (Guyer, 2001). This document shows a small-scale cogeneration system, obtaining heat from a heater, where the expander's input is constant: it is different to our system in the fact that this cannot work transitorily, and in addition, this proposal generates the heat to satisfy all needs, using a greater amount of fuel to generate electrical energy, burning more fuel than is necessary.

*Heat pump with integral solar collector* (Gurin, 2016). In this document a Rankine cycle is used, which shows heat recovery and which could have cogeneration. However, this system requires a heat pump to work, since this system would not be able to operate only with the solar collector.

With this invention, it is sought to apply a configuration of the ORC cycle, targeted to small applications such as the residential sector, with the condition of having a solar collector providing hot water at the same time that electric energy is obtained.

DETAILED DESCRIPTION OF THE INVENTION

Figure 1:
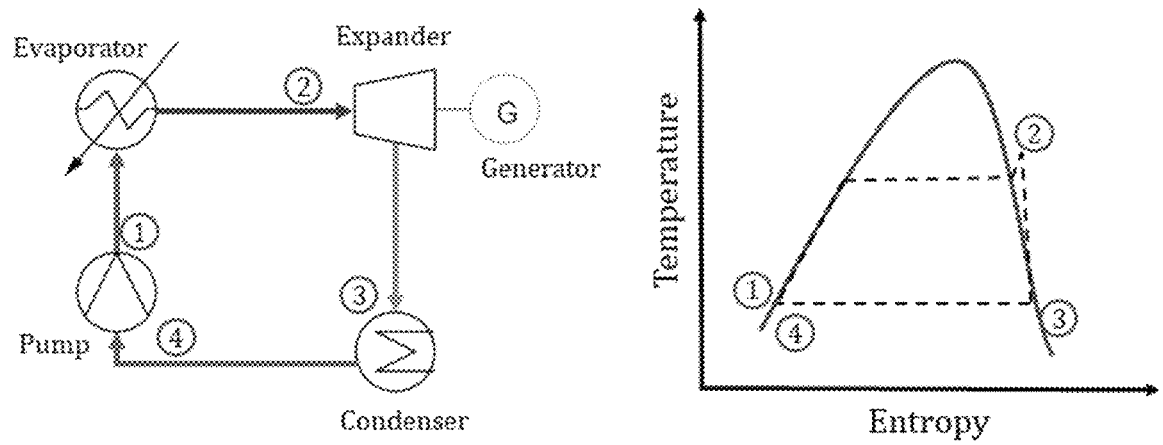
FIG. 1 A temperature-entropy scheme and diagram of the ORC is shown, which consists of a pump, which pressurizes the working fluid and transfers it to the evaporator (1). In the evaporator, the working fluid is heated up to its saturation point or overheated steam (2), then this fluid expands (3) through the expander, where the mechanical work is produced, which, by connecting the expander's shaft to an electrical generator, can convert the work into an electrical energy. Once the overheated working fluid comes out of the expander, it is condensed into a saturated liquid in the condenser (4), where the liquid is then pressurized again and transferred by the pump, closing the cycle (Lecompte, 2015).
Figure 2:
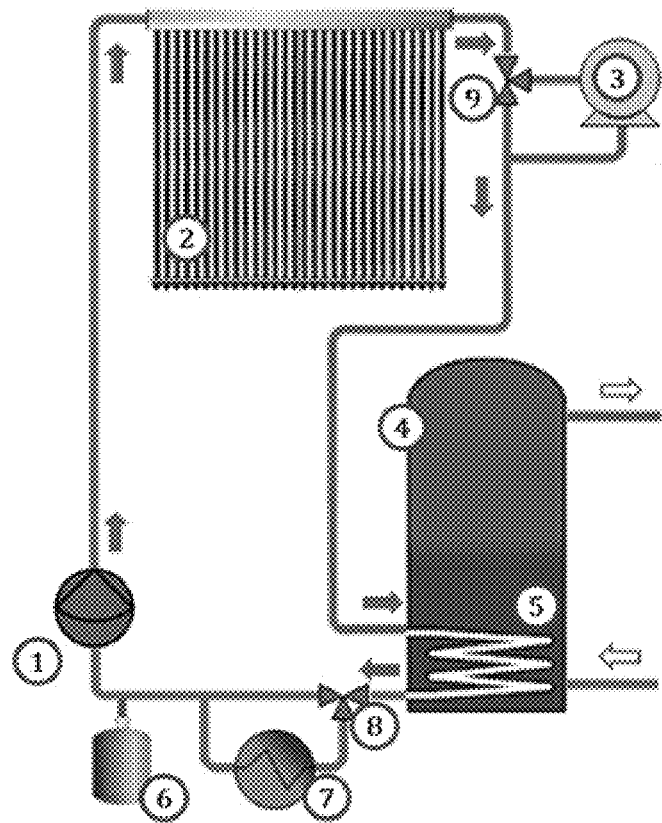
FIG. 2. The proposed architecture of the Organic Rankine Cycle (ORC) is shown.

This invention provides a cogeneration system for the integration in solar water heating systems, which comprises a solar collector (evaporator) (2), which is interconnected with a two-position and three-way valve (9). In one position, the valve (9) allows the working fluid flow towards the condenser (5), and in another position of the valve, (9) the working fluid flow is conducted towards an expanding device (3).

The working fluid that comes out of the expanding device (3) is conducted towards the condenser (5). The condenser (5) is a heat exchanger that is submerged in the thermal tank (4).

The output of the condenser (5) is interconnected with the valve (8), which has two positions and three ways. In one position, this valve (8) allows the working fluid flow towards a fluid pump (1) and in another position, the valve (8) diverts the flow towards an auxiliary heat exchanger (7). The working fluid output from the auxiliary heat exchanger (7) is interconnected with the fluid pump (1). In the fluid pump intake duct (1), a receptive tank is interconnected (6).

A characteristic of the proposed system is that it can work two operation modes: water heating only and water heating along with electric energy production. The different operation modes are described below, as required.

Example 1. Operation Mode: Water Heating

The system configuration exclusively for hot water production consists in directing the working fluid, after exiting the evaporator (2), towards the valve (9), which is found in a position that conducts the fluid directly towards the condenser (5) in the thermal tank (4). Through the exchanger (5), the working fluid transfers heat indirectly to the water in the thermal tank (4). To achieve an efficient operation, the operation conditions regarding the mass flow of the working fluid, are controlled to allow the working fluid temperature at the output of the collector (2) to be higher than the preset average thermal tank (4) water temperature. The working fluid that comes from the condenser (5) out of the thermal tank (4) is conducted towards the valve (8) which is in a position that directs the flow towards the fluid pump (1). The working fluid that comes out of the fluid pump (1) is conducted towards the evaporator (2) input. This cycle is maintained while the working fluid temperature at the evaporator output is higher than the thermal tank (4) water temperature.

Example 2. Operation Mode: Organic Rankine Cycle

The thermal energy intake towards the thermal tank (4) water, when there is low hot water demand, causes the progressive water temperature increase inside the thermal tank. Once the thermal tank (4) temperature reaches a preset operation temperature, the valve (9) changes position, directing the working fluid flow towards the expander (3).

Simultaneously, the pump is turned off momentarily in order to drain the working fluid from the piping and the submerged heat exchanger, storing the working fluid in a receptor tank (6), which also has the sub-function of keeping the working fluid that was not used in the Rankine cycle.

After this, the fluid pump (1) starts working with a mass flow that allows producing overheated steam at the evaporator output (2).

The variation of the solar resource and, consequently, of the heat transferred to the working fluid in the evaporator (solar collector) requires the flow to be regulated taking the solar resource into account to maintain an overheated steam production at the evaporator output (2). This regulation of mass flow is performed through a control system, which regulates the pump (1) mass flow, which allows the temperature regulation at the expander output, but with a variable mass flow.

The expander can start working at the moment there is a pressure differential between the hot side (collector output) and the cold side (thermal tank and/or condenser) of the system, and it is capable of converting part of the evaporator (5) heat into useable mechanical work. This way, the solar energy captured by the solar collector that is not required for water heating when the latter has reached its preset temperature is used to produce mechanical work.

The discarded heat at the end of the expander (3) is used to continue heating the thermal tank water, when the thermal tank (4) water temperature conditions allow it, thus managing to have electrical and thermal energy cogeneration.

As heat is transferred into the thermal tank (4) water, its temperature increases and the temperature difference between the working fluid and the tank water decreases; this eventually reduces the condenser (5) capacity to remove the heat necessary for working fluid condensation.

Under these circumstances, an auxiliary heat interchanger is necessary to remove the heat necessary to sub-cool the working fluid before it reaches the fluid pump (1). To achieve this heat removal, the valve (8) changes position in a way that it conducts the working fluid towards the auxiliary heat exchanger (7) where the heat required to have the receptor tank liquid sub-cooled and to complete the Rankine cycle is discarded. In the conditions where heat removal in the condenser (5) is enough, the secondary valve (8) is placed in a position so it conducts the fluid directly towards the receptor tank.

When it is necessary that all the heat provided by the collector be completely applied for water heating, the valve (9) changes into a position that allows the fluid to pass directly into the condenser (5), homogenizing the pressure in the whole system.

Example 3. Preferential Operation of the Organic Rankine Cycle System

The heat transfer is performed directly from the solar collector towards the ORC working fluid and the transference of the enthalpy of the fluid not extracted by the expander, towards the hot water thermal tank for the simultaneous production of hot water and electricity.

The ORC system is regulated through a control by means of software, which allows deciding whether the ORC operational set-up affects hot water availability based in an analysis algorithm of the annual hot water demand. Thus it is possible to exchange the system operation modes. This analysis not only depends on the thermal tank water temperature, but also on the time of the year and the day of the week. In cases where the solar resource is not enough to provide for the immediate need of hot water, the control software allows changing the course of the fluid flow, directly into the thermal tank without passing through the expander. As an option, the cogeneration system can include an interface that includes features that allow for setting maximum desired temperature of the thermal tank water, which will determine the startup and stoppage of the Organic Rankine Cycle operation mode. The Organic Rankine Cycle operation mode stoppage implies going back to the exclusive water heating mode.

Example 4. Results

For this particular case there are considered a higher temperature around 120° C. and a lower temperature of 60° C., with a 500 kPa pressure difference and a nominal mass flow of 10.78 kg/hr. This mass flow is variable to maintain an almost constant enthalpy at the collector output.

In this scenario, it is possible to produce around 500 kWh of electricity from the conditions assumed in the analysis, without affecting the calorific energy required for water heating.

The efficiency reached by the proposed system is greater than conventional systems, due to the fact that this proposed setting eliminates the need of an intermediate heat exchanger (between the heat source and the ORC) that exists in the rest of the systems in order to control temperature. In the proposed setting, the control system regulates such temperature through the mass flow, using a variable flow expander, achieving 13% cycle efficiency, generating around 750 kWh/year.

Example 5. Heating Mode

The main difference observed in the reported ORC systems is that none of these devices or systems work transitorily, meaning that in all the proposed systems the heat source that feeds the Rankine cycle evaporator operates in a stable or regulated way through an intermediate heat exchanger. Conversely, in this proposal, the solar irradiance is received directly by the evaporator, achieving greater cycle efficiency by eliminating intermediate stages. To solve this, the proposed system uses a variable flow pump as a control variable, which supplying the expander with the working fluid with constant enthalpy. In turn, the proposed expander is capable of working with different mass flows, which delivers a mechanical work to the electric generator at different speeds, where a micro inverter transforms the voltage and current delivered into useable electric energy.

Another operative feature not found in other systems is the scale in which this system is applied. In the proposed setting, the organic fluid is overheated in the evaporator (collector) and then is passed through the expander, where certain mechanical work is obtained; then the saturated steam or fluid is passed through a heat exchanger submerged in the thermal tank, using this heat for water heating. In turn, if a greater amount of water or a higher temperature is required, the overheated fluid may pass directly towards such exchanger, to provide for this need. Thus there is versatility of generating hot water and/or electric energy, obtaining a greater benefit from a domestic solar collector. A brief review of the patents about this topic is shown below.

Therefore, having sufficiently described my invention, which I deem innovative, I claim the content of the following clauses as my exclusive property:

The invention claimed is:

1. A cogeneration system for integration into solar water heating systems comprising:
   a solar collector;
   a condenser having an input connected to the solar collector, the condenser including a heat exchanger inside a hot water storage tank;
   an expansion device located between the solar collector and the condenser;
   a first two-position, three-way valve having a first side connected to the solar collector, a second side connected to the condenser, and a third side connected to the expansion device;
   a pump connected to an output of the condenser;
   an auxiliary heat exchanger located between the condenser and the pump;
   a receptor tank located between the heat exchanger and the pump;
   a second two-position, three-way valve having a first side connected to the output of the condenser, a second side connected to an input of the pump, and a third side connected to an input of the auxiliary heat exchanger;
   wherein in a first position, the first two-position, three-way valve passes a working fluid from the solar collector towards the condenser, and in a second position the first two-position, three-way valve conducts the working fluid from the solar collector towards the expansion device,
   wherein in a first position, the second two-position, three-way valve passes the working fluid coming out of the output of the condenser towards the pump, and in a second position, the second two-position, three-way valve passes the working fluid coming out of the output of the condenser towards the auxiliary heat exchanger;
   wherein an output of the auxiliary heat interchanger is connected to the input of the pump and the output of the pump is connected to the solar collector.

2. The cogeneration system according to claim 1, wherein in a first operation mode for exclusive production of hot water, the working fluid exiting the solar collector passes through a first position on the first two-position, three-way valve that conducts the working fluid directly into the heat exchanger inside the condenser to indirectly transfer heat through the heat exchanger into water in the hot water storage tank; thus, the temperature of the working fluid at the output of the collector is higher than a preset temperature of the hot water storage tank; the working fluid coming from the output of the condenser is conducted towards the second two-position, three-way valve that is in the first position conducting the flow directly towards the pump, the working fluid that comes out of the pump is conducted towards an input of the solar collector, a cycle is maintained as long as the working fluid temperature at the collector output is higher than the water temperature of the hot water storage tank.

3. The cogeneration system according to claim 1, wherein in a second operation mode, when a temperature in the hot water storage tank reaches a preset operation temperature, the first two-position, three-way valve shifts to a second position, conducting the working fluid from the solar collector towards the expansion device and simultaneously, the pump is momentarily shut down in order to drain the working fluid found in pipes and in the heat exchanger, storing the working fluid in the receptor tank, the receptor tank stores unused working fluid when working in a rankine cycle; then, when the pump starts working, a mass flow allows producing overheated steam at the output of the solar collector.

4. The cogeneration system according to claim 3, further including a control system to regulate the mass flow in the pump.

5. The cogeneration system according to claim 3, wherein the expansion device starts working at a moment there is differential pressure between the output of the collector and the inside of the hot water storage tank, a first portion of the heat of the solar collector is converted into mechanical work by the expansion device; and a second portion of the heat of the solar collector that cannot be converted to mechanical work is used to continue heating the hot water storage tank.

6. The cogeneration system according to claim 3, wherein when heat removal in the condenser is insufficient, the second two-position, three-way valve changes to the second position conducting the working fluid coming out of the condenser towards the auxiliary heat exchanger where to discard the heat required to have the working fluid sub-cooled in the receptor tank and completes the rankine cycle; wherein when the condenser heat removal is sufficient, the second two-position, three-way valve is placed in the first position, conducting the conducting fluid directly towards the receptor tank.

* * * * *